United States Patent
Bash et al.

(10) Patent No.: US 11,029,682 B2
(45) Date of Patent: *Jun. 8, 2021

(54) APPARATUS AND METHOD FOR CENTRALIZED CONTROL OF VEHICLES

(71) Applicant: Flytrex Aviation Ltd., Tel Aviv (IL)

(72) Inventors: Yariv Bash, Tel Aviv (IL); Amit Regev, Tel Aviv (IL)

(73) Assignee: Flytrex Aviation Ltd., Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/247,034

(22) Filed: Jan. 14, 2019

(65) Prior Publication Data

US 2019/0146487 A1    May 16, 2019

Related U.S. Application Data

(63) Continuation of application No. 15/646,729, filed on Jul. 11, 2017, now Pat. No. 10,191,485, which is a (Continued)

(51) Int. Cl.
*G05D 1/00* (2006.01)
*G05D 3/00* (2006.01)
(Continued)

(52) U.S. Cl.
CPC ......... *G05D 1/0027* (2013.01); *B64C 39/024* (2013.01); *G05D 1/0094* (2013.01); (Continued)

(58) Field of Classification Search
CPC .. G05D 1/0027; G05D 1/0094; B64C 39/024; G08G 5/0013; G08G 5/0034; G08G 5/0043; G08G 5/0069; G08G 5/0082
(Continued)

(56) References Cited

U.S. PATENT DOCUMENTS 5,799,263 A * 8/1998 Culbertson ............ G08G 1/123
340/994
8,615,473 B2   12/2013 Spiegel et al.
(Continued)

FOREIGN PATENT DOCUMENTS

BR   112017021483 A2   7/2018
CN       107614375 A   1/2018
(Continued)

OTHER PUBLICATIONS

The International Search Report and the Written Opinion for PCT/US2017/041514, ISA/RU, Moscow, Russia, dated Apr. 12, 2018.
(Continued)

*Primary Examiner* — Mahmoud S Ismail
(74) *Attorney, Agent, or Firm* — M&B IP Analysts, LLC

(57) ABSTRACT

An apparatus and method for centralized control of a vehicle. The apparatus includes a processing circuitry; and a memory, the memory containing instructions that, when executed by the processing circuitry, configure the apparatus to: establish control of a vehicle, wherein establishing the control further includes determining a set of instructions for controlling the vehicle, wherein the apparatus is configured to control the vehicle based on the determined set of instructions; determine, for a node, a subset of the set of instructions for controlling the vehicle; generate a mission plan for the vehicle based on a request from the node when the request is valid, wherein the request indicates a requested navigation from a first location to a second location, wherein the request is not valid when the requested navigation is not in the subset of instructions; and send, to the vehicle, control instructions for navigating to the first location and control instructions for navigating from the first location to the second location based on the mission plan.

19 Claims, 7 Drawing Sheets

Related U.S. Application Data continuation-in-part of application No. 15/447,452, filed on Mar. 2, 2017, now Pat. No. 10,274,949.

(60) Provisional application No. 62/361,711, filed on Jul. 13, 2016, provisional application No. 62/326,787, filed on Apr. 24, 2016.

(51) Int. Cl.

| | | |
|---|---|---|
| *G06F 7/00* | (2006.01) | |
| *G06F 17/00* | (2019.01) | |
| *B64C 39/02* | (2006.01) | |
| *G08G 5/00* | (2006.01) | |
| *G08G 1/123* | (2006.01) | |
| *G06Q 10/08* | (2012.01) | |

(52) U.S. Cl.
CPC ......... *G08G 5/0013* (2013.01); *G08G 5/0034* (2013.01); *G08G 5/0043* (2013.01); *G08G 5/0069* (2013.01); *G08G 5/0082* (2013.01); *B64C 2201/128* (2013.01); *B64C 2201/146* (2013.01); *G05D 1/0061* (2013.01); *G06Q 10/0832* (2013.01)

(58) Field of Classification Search
USPC .............................................. 701/2; 340/994
See application file for complete search history.

(56) References Cited

U.S. PATENT DOCUMENTS

| | | | |
|---|---|---|---|
| 8,914,182 B2 | 12/2014 | Casado et al. | |
| 9,082,293 B2 | 7/2015 | Wellman et al. | |
| 9,102,406 B2 | 8/2015 | Stark et al. | |
| 9,221,538 B2 | 12/2015 | Takahashi et al. | |
| 9,368,026 B1 | 6/2016 | Herbach et al. | |
| 9,852,642 B2 | 12/2017 | Butler et al. | |
| 10,372,142 B2 | 8/2019 | Venturelli | |
| 2006/0161440 A1* | 7/2006 | Nakayama | B60R 16/0373 |
| | | | 704/270 |
| 2010/0070124 A1 | 3/2010 | Yeager et al. | |
| 2012/0237028 A1 | 9/2012 | Khazan et al. | |
| 2014/0254896 A1 | 9/2014 | Zhou et al. | |
| 2015/0073624 A1 | 3/2015 | Takahashi et al. | |
| 2015/0154136 A1* | 6/2015 | Markovic | H04L 12/6418 |
| | | | 710/317 |
| 2015/0370251 A1* | 12/2015 | Siegel | G05D 1/00 |
| | | | 701/2 |
| 2015/0379874 A1 | 12/2015 | Ubhi et al. | |
| 2016/0018230 A1 | 1/2016 | Neubecker et al. | |
| 2016/0033966 A1* | 2/2016 | Farris | A47G 29/141 |
| | | | 701/15 |
| 2016/0039300 A1 | 2/2016 | Wang et al. | |
| 2016/0068264 A1 | 3/2016 | Ganesh et al. | |
| 2016/0125735 A1* | 5/2016 | Tuukkanen | G08G 1/202 |
| | | | 701/23 |
| 2016/0274578 A1 | 9/2016 | Arwine | |
| 2017/0316621 A1* | 11/2017 | Jefferies | G06Q 50/30 |
| 2018/0044000 A1 | 2/2018 | Venturelli et al. | |
| 2018/0188747 A1 | 7/2018 | Venturelli | |

FOREIGN PATENT DOCUMENTS

| | | |
|---|---|---|
| CN | 107924190 A | 4/2018 |
| EP | 2767962 A1 | 8/2014 |
| EP | 3280638 A1 | 2/2018 |
| EP | 3314344 A1 | 5/2018 |
| EP | 3280638 A4 | 12/2018 |
| EP | 3314344 A4 | 2/2019 |
| IN | 201727035253 | 12/2017 |
| MX | 2017012941 A | 11/2018 |
| RU | 2217797 C2 | 11/2003 |
| WO | 2015061008 A1 | 4/2015 |
| WO | 2015160672 A1 | 10/2015 |
| WO | 2016164416 A1 | 10/2016 |
| WO | 2016210156 A1 | 12/2016 |

OTHER PUBLICATIONS

The European Search Report for EP Application No: 17837369.2, The European Patent Office, The Hague: dated Jan. 23, 2020.
Notice of Deficiencies for European Patent Application No. 17837369.2, dated Sep. 3, 2020, EPO, Munich, Germany.
Notice of Deficiencies for European Patent Application No. 17837369.2, dated Jan. 15, 2021, EPO, Munich, Germany.

* cited by examiner

APPARATUS AND METHOD FOR CENTRALIZED CONTROL OF VEHICLES

CROSS-REFERENCE TO RELATED APPLICATIONS

This application is a continuation of U.S. patent application Ser. No. 15/646,729 filed on Jul. 11, 2017, now allowed, which claims the benefit of U.S. Provisional Application No. 62/361,711 filed on Jul. 13, 2016. The application Ser. No. 15/646,729 is also a continuation-in-part of U.S. patent application Ser. No. 15/447,452 filed on Mar. 2, 2017, now allowed, which claims the benefit of U.S. Provisional Application No. 62/326,787 filed on Apr. 24, 2016.

The contents of the above-referenced applications are hereby incorporated by reference.

TECHNICAL FIELD

The present disclosure relates generally to unmanned vehicles, and more particularly to third party control of unmanned vehicles.

BACKGROUND

Unmanned vehicles (UVs) are seeing increased industry use as improvements in fields such as artificial intelligence, battery life, and computational are made. As an example, companies such as Amazon® are increasingly using UVs such as drones to deliver packages. As a result, some companies will likely begin to utilize hundreds or thousands of UVs at once to provide services.

Control over UVs may be complicated, due in part to a need to balance autonomous control with manual control. One particular use for UVs is controlling a fleet of UVs simultaneously, where control becomes exponentially more complicated. Manual control of each and every UV may be undesirable due to, e.g., excessive labor costs, human error, and the like.

Many solutions for automated navigation of UVs utilize on-board computations, thereby requiring more expensive hardware on-board each UV for performing computations. These costs are exacerbated when multiple UVs (i.e., a fleet) are controlled. Further, the computations needed to successfully navigate to target locations often become increasingly complex as an UV approaches the target. Specifically, as an UV approaches a target, travel by the UV requires more precise movements to, e.g., arrive at the correct geographical coordinates, avoid near-the-ground obstacles, land safely, and the like.

As a result of the difficulty in precisely navigating when approaching a landing site, existing UV solutions often face challenges arriving at particular sub-locations of a landing location. For example, many existing UV solutions cannot successfully pilot the UV to, e.g., a particular room or floor of a building. This inability to pilot to particular sub-locations can result in meddling with the UV, thereby frustrating its intended goal. As an example, when a drone delivers a package to an apartment complex, the drone may land in a general zone outside of the complex, which leaves the drone vulnerable to theft by a person other than the intended recipient.

Additionally, some existing solutions for landing UVs require the landing site to have a pre-known landing mat or other guide marker to successfully land. Such solutions can face challenges when the guide marker is obfuscated (e.g., if a visual guide marker is visually blocked or if signals from a guide marker are blocked or otherwise subject to interference). Further, if the landing site does not have a suitable guide marker, the UV may be unable to successfully navigate to the landing site.

Further, some existing solutions provide automated detection systems utilized to avoid and navigate around obstacles. Such solutions may still face challenges when obstacles are small or otherwise difficult for sensors of the UV to detect.

Drones typically require significant infrastructure to implement at larger scales (e.g., for a company). Thus, although drones and other unmanned vehicles may provide significant advantages such as reduced cost and increased shipping speed, such third parties may be unable to take advantage of drones. However, offering complete access to drones by third parties decreases security of drone operations and can result in malicious use of those drones.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include an apparatus for centralized control of a vehicle. The apparatus comprises: a processing circuitry; and a memory, the memory containing instructions that, when executed by the processing circuitry, configure the apparatus to: establish control of a vehicle, wherein establishing the control further includes determining a set of instructions for controlling the vehicle, wherein the apparatus is configured to control the vehicle based on the determined set of instructions; determine, for a node, a subset of the set of instructions for controlling the vehicle; generate a mission plan for the vehicle based on a request from the node when the request is valid, wherein the request indicates a requested navigation from a first location to a second location, wherein the request is not valid when the requested navigation is not in the subset of instructions; and send, to the vehicle, control instructions for navigating to the first location and control instructions for navigating from the first location to the second location based on the mission plan.

Certain embodiments disclosed herein also include a non-transitory computer readable medium having stored thereon instructions for causing a processing circuitry to perform a process, the process comprising: establishing control of a vehicle, wherein establishing the control further comprises determining a set of instructions for controlling the vehicle, wherein the apparatus is configured to control the vehicle based on the determined set of instructions; determining, for a node, a subset of the set of instructions for controlling the vehicle; generating a mission plan for the vehicle based on a request from the node when the request is valid, wherein the request indicates a requested navigation from a first location to a second location, wherein the request is not valid when the requested navigation is not in the subset of instructions; and sending, to the vehicle, control instructions for navigating to the first location and control instructions for navigating from the first location to the second location based on the mission plan.

Certain embodiments disclosed herein also include a method for centralized control of a vehicle. The method comprises: establishing control of a vehicle, wherein establishing the control further comprises determining a set of instructions for controlling the vehicle, wherein the apparatus is configured to control the vehicle based on the determined set of instructions; determining, for a node, a subset of the set of instructions for controlling the vehicle; generating a mission plan for the vehicle based on a request from the node when the request is valid, wherein the request indicates a requested navigation from a first location to a second location, wherein the request is not valid when the requested navigation is not in the subset of instructions; and sending, to the vehicle, control instructions for navigating to the first location and control instructions for navigating from the first location to the second location based on the mission plan.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
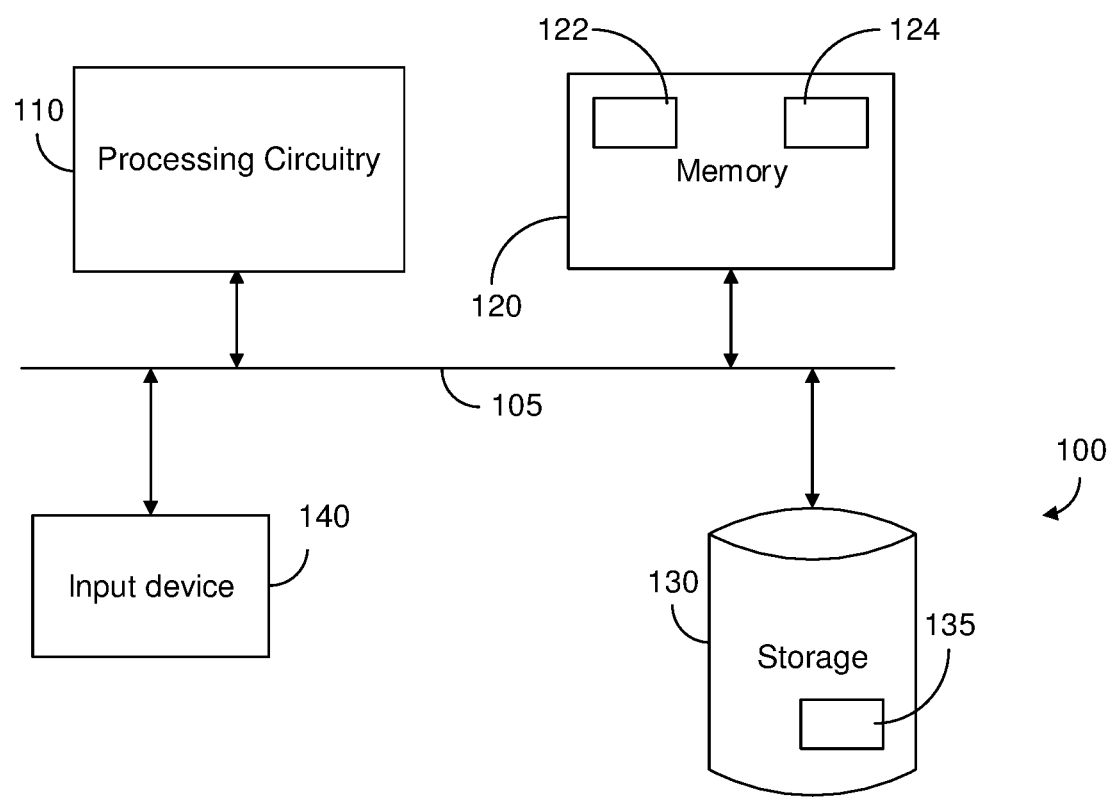
FIG. 1 is a schematic diagram of an unmanned vehicle control system according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for centralized control of unmanned vehicles (UVs) operated by third parties. A first node is configured to establish exclusive control of an UV. The first node is configured to automatically control the UV while in a first mode during operation of the UV. The first node is configured to receive a request for access by a second node. When the second node is authorized, the first node is configured to grant, to the second node, third party access to the UV.

A mission plan is generated based on control instructions received from the second node. The control instructions indicate at least a start location and an end location. Based on the mission plan, the first node is configured to control the UV in the second mode. during the second mode, the first node is configured to send instructions for navigating to the start location to the UV. When the UV arrives at the start location, the first node is configured to send instructions for navigating to the end location.

The first node may be configured to switch between the first mode and the second mode based on at least one mode-changing event. The mode-changing event may be generation of the mission plan, arriving at the second location, releasing a payload at the second location, and the like. Control instructions that will be implemented while in the second mode may be limited based on the second node, the UV, a type of the UV, a current geographical location of the UV, or a combination thereof.

The embodiments disclosed herein allow for centralized control of UVs by third parties. The first node may be a system operated by an owner of the UV such that direct access to the UV is not granted to the second node and the UV cannot be hijacked by the third party. Such centralized control therefore increases security of third party vehicle operation as compared to, for example, allowing direct access to the vehicle's controls by the third party.

FIG. 1 shows an example schematic diagram of an apparatus 100 for centralized control of UVs according to an embodiment. The apparatus 100 includes a processing circuitry 110, a memory 120, a storage 130, and a network interface 140. In an embodiment, the components of the UV apparatus 100 may be communicatively connected via a bus 105. In certain embodiments, the apparatus 100 may also be used for fully automated control of UVs.

The processing circuitry 110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 120 may be volatile (e.g., RAM, etc.), non-volatile (e.g., ROM, flash memory, etc.), or a combination thereof. The memory 120 may further be used as a working scratch pad for the processing circuitry 110, as a temporary storage, and the like. In one embodiment, computer readable instructions to implement one or more embodiments disclosed herein may be stored in the storage 130. In another embodiment, the memory 120 may be further configured to store a plurality of control instructions for centralized control of UV systems.

In another embodiment, the memory 120 includes a memory portion 122 for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry, cause the processing circuitry 110 to perform the various processes described herein. Specifically, the instructions, when executed, cause the processing circuitry 110 to at least switch between automatic and secondary control over one or more UVs based on events related to the UVs.

In yet another embodiment, the memory 120 includes a memory portion 124 having stored thereon control instructions for an UV system. The control instructions for the UV system may be a subset of the plurality of control instructions for centralized control of UV systems.

The storage 130 may be magnetic storage, optical storage, and the like, and may be realized, for example, as flash memory or other memory technology, CD-ROM, Digital Versatile Disks (DVDs), or any other medium which can be used to store the desired information. The storage 130 may store instructions for causing processing circuitries to execute the methods described herein, unique identifiers (e.g., a unique identifier of a user device (e.g., an IoT device), of a user device, or of a user account associated with an IoT device), and the like. In some embodiments, the storage 130 further includes a storage portion 135. The storage portion 135 may store therein an identifier of at least one user device, and at least one control instruction associated with each user device. The stored identifiers and associated instructions may be utilized to determine whether control instructions sent by a given user device may be executed by a UV being controlled by the user device. The storage portion 135 may further include UV capabilities of one or more UVs, which may be utilized to select a UV to execute a mission plan as described further herein below with respect to FIG. 7.

The network interface 140 allows the apparatus 100 to communicate with, for example, user devices, control systems, UV systems, or a combination thereof, for purposes such as sending and receiving control instructions. The network interface 140 may include a wired connection or a wireless connection.

It should be understood that the embodiments described herein are not limited to the specific architecture illustrated in FIG. 1, and other architectures may be equally used without departing from the scope of the disclosed embodiments.

Figure 2:
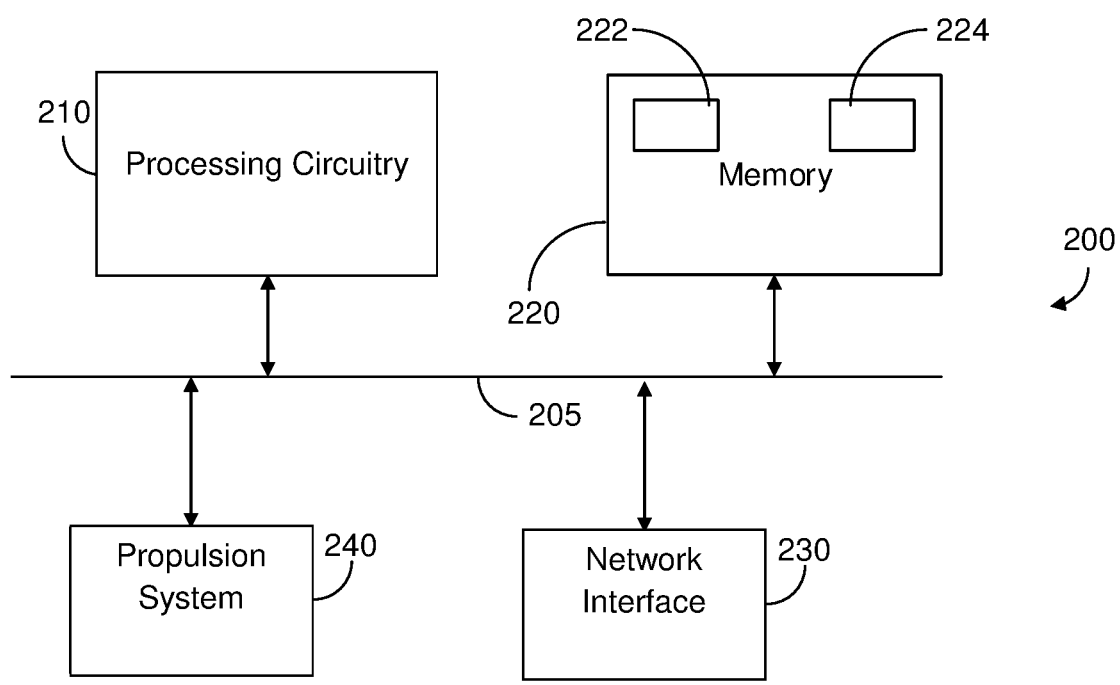
FIG. 2 is a schematic diagram of an unmanned vehicle system.

FIG. 2 is an example schematic diagram of an UV system 200. The UV system 200 may be controlled based on instructions received from the apparatus 100. The UV system 200 includes a processing circuitry 210, a memory 220, a network interface 230, and a propulsion system 240. In an embodiment, the components of the UV system 200 may be communicatively connected via a bus 205. The UV system 200 may be further communicatively connected to one or more sensors (not shown) of a UV such as, but not limited to, a global positioning system, sound sensors, light sensors, accelerometers, gyroscopes, cameras, and the like.

The UV system 200 may be installed in proximity (e.g., in, on, or otherwise within physical proximity) to an unmanned or uncrewed vehicle such as, but not limited to, an unmanned ground vehicle (e.g., an autonomous car), an unmanned aerial vehicle or unmanned combat aerial vehicle (e.g., a drone), an unmanned surface vehicle, an autonomous underwater vehicle or unmanned undersea vehicle, an unmanned spacecraft, and the like. In an embodiment, the UV system 200 is configured to control, via the propulsion system 240, operations of the unmanned vehicle such as, but not limited to, locomotion, direction, height (i.e., aerial), depth (i.e., underwater), use of sensors, use of tools (e.g., tools for agriculture, mining, emergency rescue, etc.), and the like.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. The memory 220 may further be used as a working scratch pad for the processing circuitry 210, as a temporary storage, and the like.

In another embodiment, the memory 220 includes a memory portion 222 for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry, cause the processing circuitry 210 to control the propulsion system 240.

In yet another embodiment, the memory 220 includes a memory portion 224 having stored thereon a shared password for communicating with, e.g., the apparatus 100.

The network interface 230 provides network connectivity for the UV system 200. To this end, the network interface 230 may include a plurality of transceivers, thereby enabling communications via, but not limited to, satellite, radio frequency (RF) channels (e.g., LoRa and SIGFOX), cellular networks, and the like.

The propulsion system 240 may include or be communicatively connected to, but is not limited to, one or more motors, propellers, engines, and the like. The propulsion system 240 is configured to at least cause movement of an UV (not shown) of the UV system 200.

It should be understood that the embodiments described herein are not limited to the specific architecture illustrated in FIG. 2, and that other architectures may be equally used without departing from the scope of the disclosed embodiments.

Figure 3:
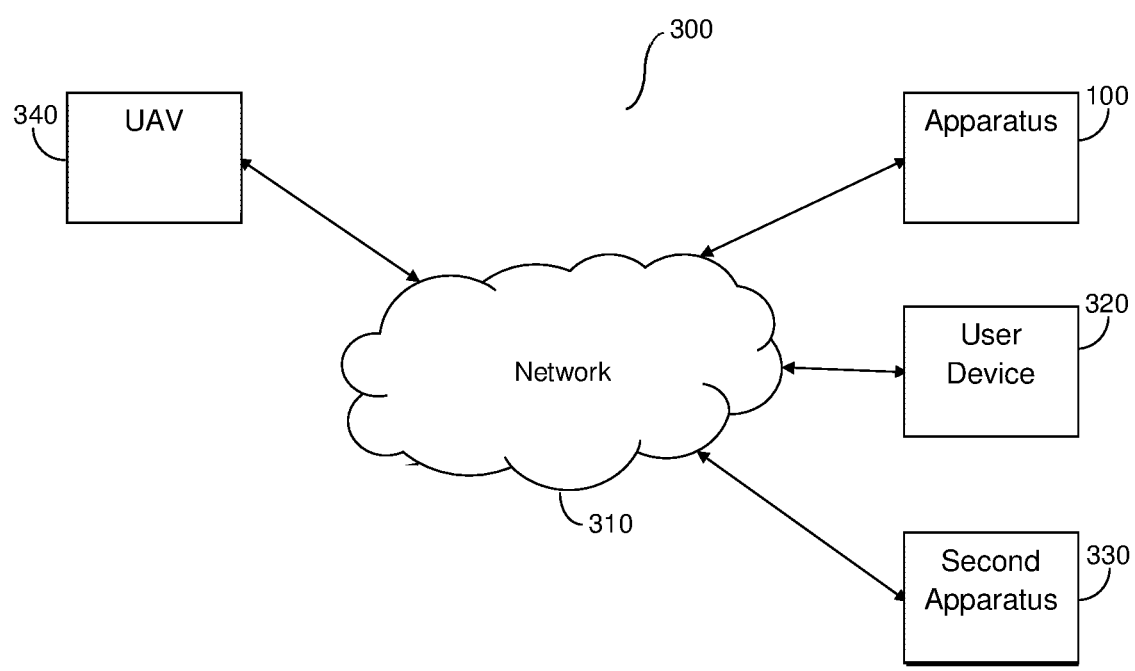
FIG. 3 is a network diagram utilized to describe various disclosed embodiments.

FIG. 3 is an example network diagram 300 utilized to describe various disclosed embodiments. In the example network diagram 300, the apparatus 100 for centralized control of UVs is communicatively connected to a user device 320, a second apparatus 330, and an unmanned aerial vehicle (UAV) 340, over a network 310. The network 310 may be, but is not limited to, a wireless, a cellular or wired network, a local area network (LAN), a wide area network (WAN), a metro area network (MAN), the Internet, the worldwide web (WWW), similar networks, and any combination thereof. The network 310 may provide wired, wireless, or cellular connectivity, or a combination thereof.

The user device 320 may be, but is not limited to, a personal computer, a laptop, a tablet computer, a smartphone, a wearable computing device, or any other device capable of receiving inputs related to control instructions and to send control instructions for an UV system (e.g., the unmanned aerial vehicle 340). The user device 320 may be configured to send, to the apparatus 100, control instructions for controlling an UV such as, e.g., the unmanned aerial vehicle 340, an unmanned nautical vehicle (not shown), an autonomous car (not shown), or a combination thereof (e.g., instructions for the unmanned aerial vehicle 340 and instructions for the autonomous car). In some embodiments, the user device 320 is configured to send, to the apparatus 100, a request to send the control instructions from the apparatus 100 to, for example, the unmanned aerial vehicle 340. The apparatus 100 may be configured to perform a check to determine if the user device 320 is authorized to request sending any, or all, of the requested control instructions, and to only send control instructions that the user device 320 is authorized to send.

The unmanned aerial vehicle 340 may include an UV system such as, but not limited to, the UV system 200, FIG. 2. The UV system included in the UAV 340 may be configured to receive control instructions from the apparatus 100, and to cause operation of the UAV 340 in accordance with the received control instructions.

In an embodiment, the apparatus 100 is configured to automatically send control instructions to the UAV 340 during operation. In a further embodiment, the apparatus 100 may be configured to switch between automatic control and user-based manual control (e.g., via the user device 320) over the UAV 340. The user-based manual control may include receiving instructions from a user device and determining, based on the received instructions, instructions to send to the UAV 340. In another embodiment, the user-based manual control may be at least partially automatic (i.e., based both on instructions received from a user device and based on inputs used for automatically determining instructions such as sensor signals). As a non-limiting example, during user-based manual control, movement of the UAV 340 may be primarily controlled based on instructions received from a user device except for automatically controlled movement for avoiding obstacles such as birds or cars.

In yet a further embodiment, the apparatus 100 may be configured to switch from a first mode of control (e.g., automatic control) to a second mode of control (e.g., manual control based on instructions from another node) or vice versa when a mode changing event has occurred. Each mode changing event may be based on one or more parameters or inputs such as, but not limited to, sensor signals, received requests, status indicators related to a UV or to a portion thereof, combinations thereof, and the like. In another embodiment, the apparatus 100 may be configured to restrict control by the user device 320, thereby limiting the controls sent or applied to the UAV 340. Semi-automated control over UVs is described further herein below with respect to FIG. 4.

Different mode changing events may be utilized for, e.g., switching from and to different modes. As a non-limiting example, a first set of mode changing events may be utilized to determine when to switch from a first mode to a second mode and a second set of mode changing events may be utilized to determine when to switch from the second mode to the first mode. Further, different mode changing events may be utilized for different UVs, different types of UVs, or both. As a non-limiting example, a mode changing event for causing the UAV 340 to switch from automated to user-based manual control may be entering geographical proximity of a destination, while a mode changing event for causing an autonomous car (not shown) to switch from automated to user-based manual control may be entering a particular street.

A second apparatus 330 is configured to communicate with the apparatus 100 in order to send the apparatus 100 control instructions to be sent to an UV system (e.g., an UV system of the UAV 340), to take control over an UV system from the apparatus 100, or both. Taking control over an UV system from the apparatus 100 may include, but is not limited to, authorizing (or obtaining authorization for) the second apparatus 330 to send control instructions to an UV system, de-authorizing the apparatus 100 from sending control instructions to the UV system, or both. To this end, the second apparatus 330 may be utilized for, e.g., providing backup control over the UAV 340, in case of failure or other cessation of control by the apparatus 100. Alternatively or collectively, the second apparatus 330 may be configured to take control over the UAV 340, if it is determined that the second apparatus 330 has a better line of communication with the UAV 340, than the apparatus 100 (e.g., if communications between the second apparatus and the UAV 340 are faster than communications between the apparatus 100 and the UAAV 340).

During operation of the UAV 340 (hereinafter referred to as the operating UV, merely for simplicity purposes), the apparatus 100 may operate as a first node automatically controlling the operating UV. Either or both of the user device 320 and the second apparatus 330 may act as a second node sending instructions for controlling the UV. In an example implementation, the control instructions indicate a first start location and a second end location, where the operating UV is to navigate to the start location and then to the end location. The apparatus 100 is configured to receive control instructions from the second node, and to determine whether to implement each of the received instructions, thereby causing at least one of the operating UVs to perform each implemented instruction. In an embodiment, the apparatus 100 may operate in a first mode and in a second mode. When operating in the first mode, the apparatus 100 may automatically control the operating UV. When operating in the second mode, the apparatus 100 may control the operating UV based on instructions received from the second node that is authorized to control the operating UV.

It should be noted that the embodiments described herein above with respect to FIG. 3 are merely examples and do not limit the disclosed embodiments. Different UVs, different numbers of UVs, or both may be utilized without departing from the scope of the disclosure. As non-limiting examples, the controlled UVs may include 10 unmanned aerial vehicles; an unmanned aerial vehicle and an unmanned nautical vehicle; two autonomous cars and an unmanned aerial vehicle; an unmanned spacecraft; or any other combination of UVs. Further, the apparatus 100 may be configured to receive control instructions from a plurality of user devices, a plurality of second apparatus, or both, without departing from the scope of the disclosure.

Figure 4:
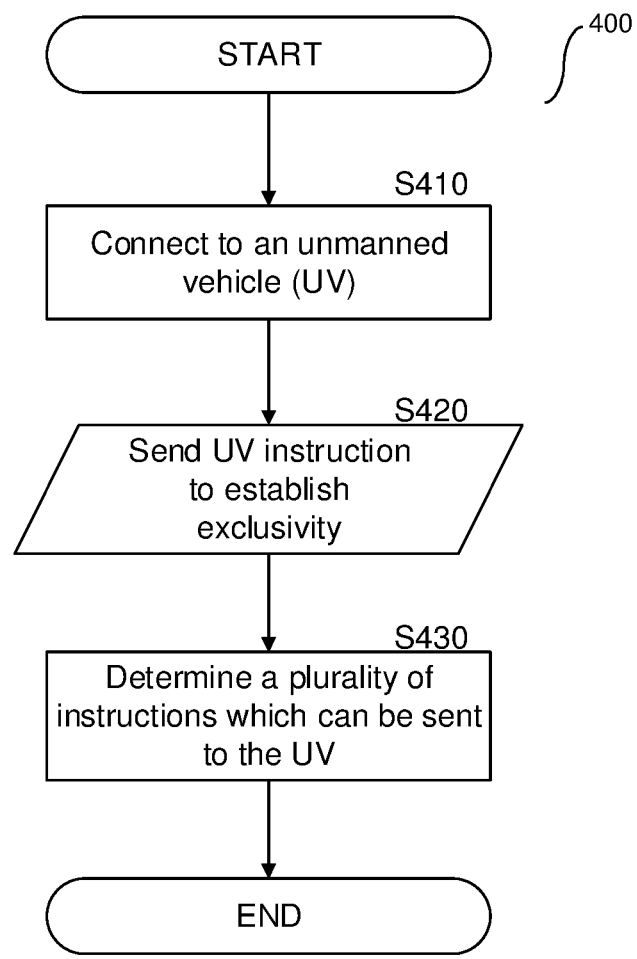
FIG. 4 is a flowchart illustrating a method for establishing control between an unmanned vehicle control system and an unmanned vehicle according to an embodiment.

FIG. 4 is an example flowchart 400 illustrating a method for establishing control between a first node (e.g., the apparatus 100) and an UV system (e.g., an UV system of the unmanned aerial vehicle 340, FIG. 3) according to an embodiment. In an embodiment, the method is performed by the first node (e.g., the apparatus 100).

At S410, a connection is established with the UV system. Establishing the connection may include opening a communication channel through a network (e.g., the network 310, FIG. 3). In a further embodiment, the connection may be a secure connection established using, for example, a shared secret.

At S420, an instruction to establish exclusive control is sent to the UV system. Once this instruction is implemented, the UV system will only accept control instructions received from the exclusive controller that sent the instruction (i.e., the first node).

At S430, a plurality of control instructions that can be sent to the UV system is determined. The plurality of control instructions can be determined based on, but not limited to, a type of the UV associated with the UV system, inputs accepted by the UV system, a combination thereof, and the like. Such control instructions may include, but are not limited to, navigation instructions, payload release instructions, payload pickup instructions, instructions to use sensors or tools, and the like. Determination of control instructions that can be sent to the UV system allows for different groups of instructions to be used for different UV systems. In particular, UVs associated with different UV systems may be able to act in accordance with only specific groups of control instructions. As a non-limiting example, an autonomous car may be able to move according to different control instructions than an unmanned nautical vehicle due to the differences in locomotion. As another example, a first unmanned aerial vehicle may be able to perform control instructions for grabbing and releasing objects (i.e., payloads), while a second unmanned aerial vehicle may not. In an embodiment, the plurality of control instructions that can be sent to an UV system may be determined based on a type of UV associated with the UV system.

It should be noted that the embodiments described herein above with respect to FIG. 4 are discussed with respect to semi-automated control between a first node for controlling UVs and one UV system merely for simplicity purposed and without limitation on the disclosed embodiments. Control may be established between a first node and multiple UV systems, either in series or in parallel, without departing from the scope of the disclosure.

Figure 5:
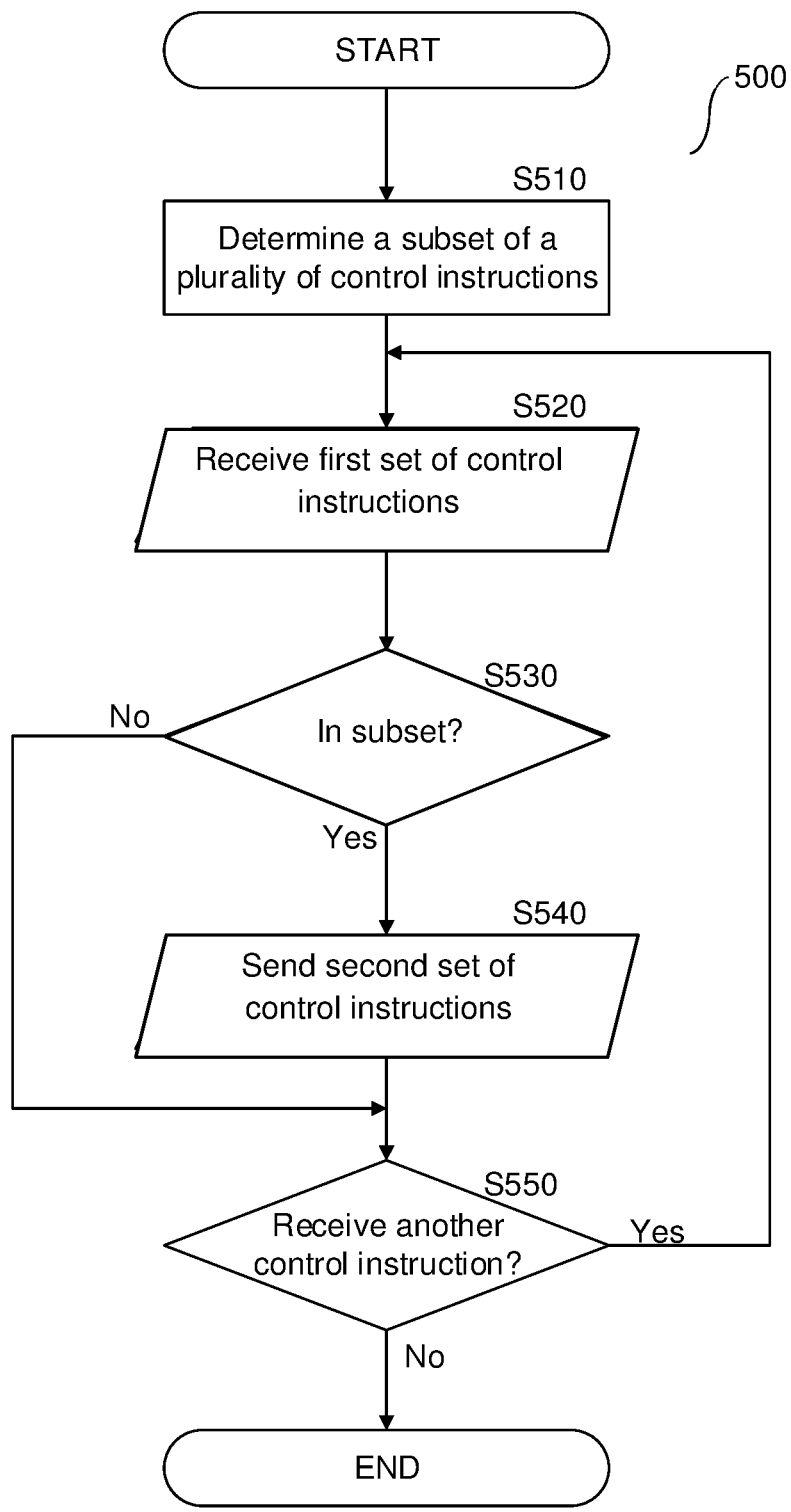
FIG. 5 is a flowchart illustrating a method for granting control access for an unmanned vehicle from an unmanned vehicle control system to a user node according to an embodiment.

FIG. 5 is an example flowchart 500 illustrating a method for controlling an UV based on instructions from a second node according to an embodiment. In an embodiment, the method is executed by a first node (e.g., the apparatus 100). In another embodiment, the second node may be, but is not limited to, a user device (e.g., the user device 320) or a second apparatus (e.g., the second apparatus 330). In an embodiment, the method may be performed when a request to control the UV is received from the second node.

At S510, a subset of allowable control instructions for controlling an UV system of the UV are determined for the second node. The subset of allowable control instructions may be a subset of a plurality of control instructions that the UV is configured to receive (e.g., the instructions determined at S430, FIG. 4). In an embodiment, if a subset of allowable control instructions for the second node controlling the UV system of the UV has previously been determined, the previously determined subset of allowable control instructions may be utilized. In an example implementation, the subset of allowable control instructions includes navigating to a start location (e.g., from a current location) and from the start location to an end location.

In an embodiment, the subset of allowable control instructions for the second node may be determined based on, but not limited to, a type of the UV, a type of the second node, control permissions associated with the second node, or a combination thereof. As a non-limiting example, a second apparatus that is known as a secure node may be associated with control permissions allowing control over movements of the UV, while a user device that it not known as a secure node may be associated with control permissions only to designate locations to which the UV will navigate.

At S520, a first set of control instructions is received from the second node. The first set of control instructions is for controlling the UV. The first set of control instructions may include instructions such as, but not limited to, a navigation instruction (e.g., instructions to navigate to a first location and then to a second location), a payload release instruction, a payload pickup instruction, an instruction to use sensors or tools, a combination thereof, and the like.

At S530, it is determined whether at least one of the received first set of control instructions is an allowable control instruction for the second node with respect to the UV and, if so, execution continues with S540; otherwise, execution continues with S550. In an embodiment, a control instruction is an allowable control instruction if it is included in the determined subset of control instructions for the second node.

At S540, when it is determined that at least one of the first set of control instructions is an allowable control instruction, a second set of control instructions is sent to the UV system. The second set of control instructions includes the determined at least one allowable control instruction. The second set of control instructions, when executed by the UV system, configure the UV to perform the sent allowable control instructions.

In an embodiment, the second set of control instructions is determined and sent in real-time. Sending the second set of control instructions in real-time allows for real-time control of the UV. In a further embodiment, it may be determined whether a predetermined period of time has passed since receipt of the first set of control instructions, and the second set of control instructions is sent to the UV system only if it is determined that the first set of control instructions was received within the predetermined time period.

In another embodiment, if two sets of control instructions are received from the second node, where a first received set is allowable and a second received set is not allowable, a rejection notice may be sent to the second node, and both of the two sets of control instructions may not be sent to the UV system until all sets of control instructions to be sent are allowable (e.g., until an allowable second set of control instructions is received).

At S550, it is checked whether additional control instructions have been received and, if so, execution continues with S520; otherwise execution terminates.

As a non-limiting example, a first node is configured with a plurality of instructions for controlling an autonomous car. A subset of the plurality of control instructions is determined for a tablet computer acting as a controlling node. The subset includes instructions for moving forward, moving backward, making left turns, making right turns, braking, turning lights on and off, and accelerating. A first set of control instructions is received from the tablet computer. The first set of control instructions includes instructions for moving forward and instructions for spraying pesticides.

It is checked whether the first set of control instructions is included in the subset of control instructions. Based on the check, it is determined that the received instruction for moving forward is an allowable control instruction, but that the received instruction for spraying pesticides is not. A second set of control instructions including the received instruction for moving forward is sent to an UV system of the autonomous car. Based on the sent second set of control instructions, the autonomous car moves forward.

Figure 6:
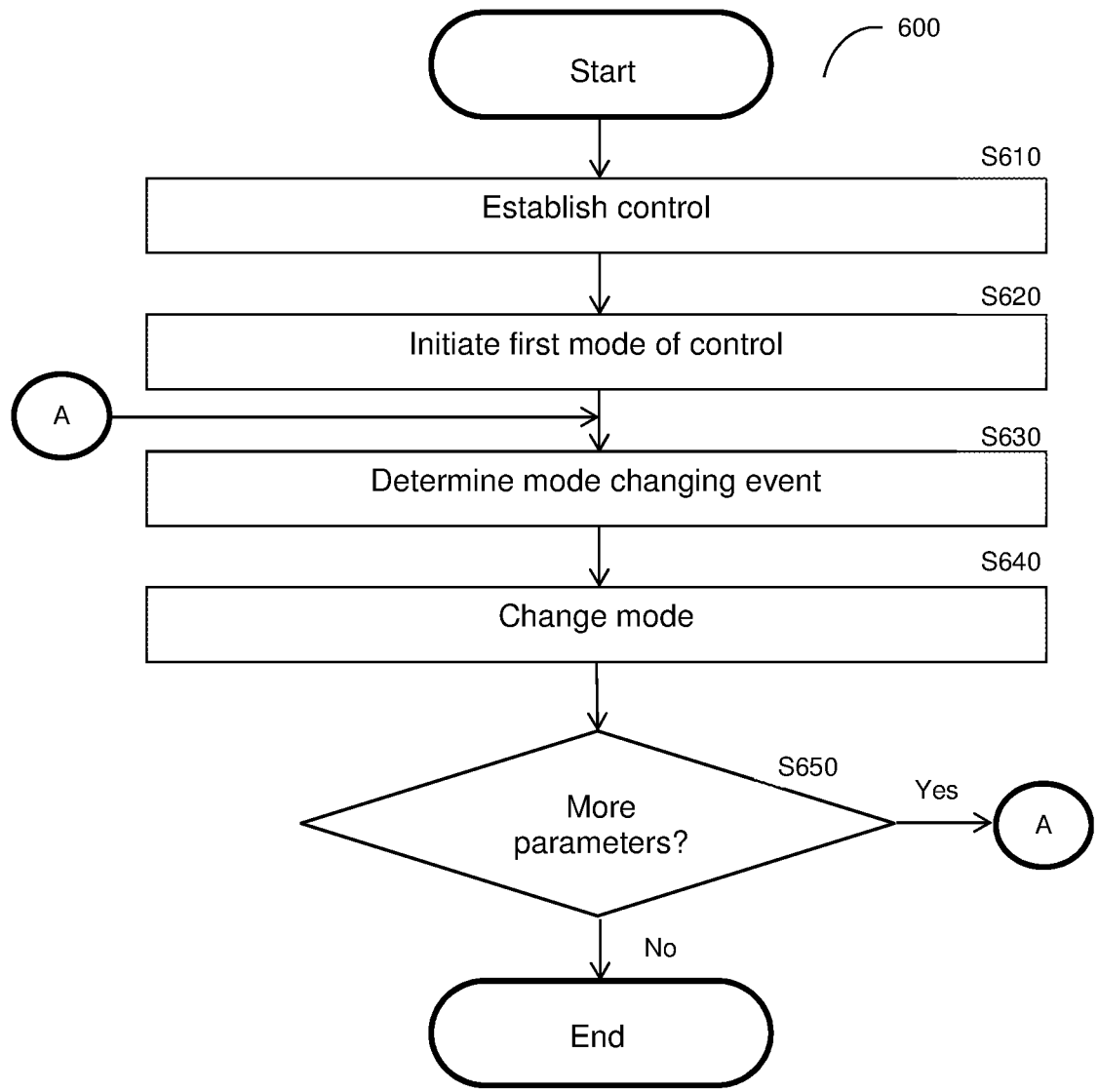
FIG. 6 is a flowchart illustrating a method for semi-automated control of a UV according to an embodiment.

FIG. 6 is an example flowchart S600 illustrating a method for semi-automated control of a UV according to an embodiment. In an embodiment, the method may be performed by a first node (e.g., the apparatus 100, FIG. 1) to control a UV (e.g., the UAV 340, FIG. 3) via a UV system (e.g., the UV system 200, FIG. 2). In a further embodiment, at least part of the method may be executed based on control instructions received from a second node (e.g., the user device 320 or the second apparatus 330, FIG. 3).

At S610, control is established between the first node and the UV system of the UV. The control may be established as described further herein above with respect to FIG. 4.

At S620, a first mode of control is initiated. The first mode of control may include, but is not limited to, automatic control by the first node. For example, during the first mode of control, the first node may receive sensory inputs from the UV system of the UV and determine, based on the received sensory inputs, instructions for navigating the UV to a destination. The instructions may be updated in real-time based on incoming sensory inputs. The first node sends the determined instructions to the UV system, thereby causing the UV system to perform the sent instructions.

At S630, a mode changing event is determined. In an embodiment, the mode changing event may be determined based on a predetermined list of mode changing events. The mode changing event may be based on one or more parameters such as, but not limited to, sensor signals, received requests, status indicators, combinations thereof, and the like.

The mode changing event may include, but are not limited to, geographic proximity to the destination (e.g., less than 300 feet of the geographic coordinates of the destination, greater than 10 kilometers away from the geographic coordinates of the destination, etc.), detection of a guide marker (e.g., a visual guide marker or a guide marker emitting a radio or other signal), the UV being in a particular geographic area (e.g., a city, a street, a borough, a state, a country, a complex, etc.), receiving a request to control the UV from the second node, failure of one or more sensors of the UV, release of a payload, a combination thereof, and the like.

In an embodiment, the mode changing event may be determined based on a current mode of control. As a non-limiting example, a first predetermined list of mode changing events including the UV being within 100 feet of the destination may be utilized while in the first mode, and a second predetermined list of mode changing events including the UV being at least 100 feet away from the destination may be utilized while in the second mode.

At S640, in response to the determination of the mode changing event, the mode is changed in real-time. When the mode is changed, the UV may be controlled based on a different set of inputs. The different set of inputs may include instructions received from a second node as described further herein above with respect to FIG. 5. For example, the UV may be controlled based on sensor signals while in a first mode and based on instructions received from the second node while in a second mode. As another example, the UV may be controlled based on sensor signals while in a first automatic mode and based on both sensor signals and a mission plan generated based on instructions received from the second node while in a second mode.

In an embodiment, S640 may include determining a subset of allowable control instructions for the second node controlling the UV. In another embodiment, the subset of allowable control instructions for the second node controlling the UV may be predetermined.

At optional S650, it is determined if additional parameters have been received and, if so, execution continues with S630; otherwise, execution terminates. Based on the additional parameters, additional mode changing events may be determined and, accordingly, the mode may be subsequently changed.

As a non-limiting example, an unmanned aerial vehicle (UAV) is utilized to deliver a package to a home. The UAV is equipped with a payload mechanism for holding and releasing payloads such as the package. A first predetermined list of mode changing events is used to determine when to switch from a first mode to a second mode. A second predetermined list of mode changing events is used to determine when to switch from the second mode to the first mode. The first predetermined list includes the UAV being within 200 feet of the geographical coordinates of the home, and the second predetermined list includes the UAV releasing the payload.

An apparatus acting as a first node establishes exclusive control with the UAV and a set of control instructions that the apparatus can use to control the UAV is determined. The determined set of control instructions includes instructions for ascending, descending, moving forward, moving backward, moving left, moving right, and releasing a payload. In the first mode, the apparatus automatically controls the UAV based on sensory inputs received from a UV system of the UV to navigate the UAV toward the home. When GPS signals from the UV system indicate that the UAV is within 200 feet of the home, a mode changing event of the first predetermined list is determined and the apparatus switches to the second mode of control.

In the second mode, the apparatus controls the UAV based on instructions received from a smart phone acting as a second node based on a user's inputs. A subset of allowable control instructions for the smart phone controlling the UAV includes descending, moving forward, moving backward, moving left, moving right, and releasing the payload. Instructions including ascending, moving forward, descending, and releasing the payload are received from three smart phone. Based on the instructions received from the smart phone, the apparatus sends instructions for moving forward, descending, and releasing the payload, but not for ascending.

In a further example, when the UAV releases the payload, a mode changing event of the second predetermined list is determined and the apparatus switches back to the first mode of control. The apparatus may automatically control the UAV to, e.g., return to its geographic location of origin or to move to a new destination.

It should be noted that the embodiments discussed herein above with respect to FIG. 6 are described as switching from a first mode of control to a second mode of control merely for simplicity purposes and without limitation on the disclosed embodiments. The method may include switching back from the second mode of control to the first mode of control without departing from the scope of the disclosure. Further, multiple switches from the first mode of control to the second mode of control, from the second mode of control to the first mode of control, or both, may be performed during a given operation of the UV without departing from the scope of the disclosure. As a non-limiting example, the first node may switch from an automatic first mode of control to a second mode of control based on instructions from the second node when the UV enters physical proximity of a destination, and may switch back from the second mode of control to the automatic first mode of control when a payload has been released.

It should be noted that the embodiments described herein above with respect to FIGS. 5 and 6 are discussed in relation to a second node and a UV merely for simplicity purposes and without limitation on the disclosed embodiments. Control instructions from a plurality of second nodes may be implemented without departing from the scope of the disclosure. Alternatively or collectively, received control instructions may be implemented via a plurality of UVs without departing from the scope of the disclosure. Control instructions from different second nodes may be implemented via different UVs.

Figure 7:
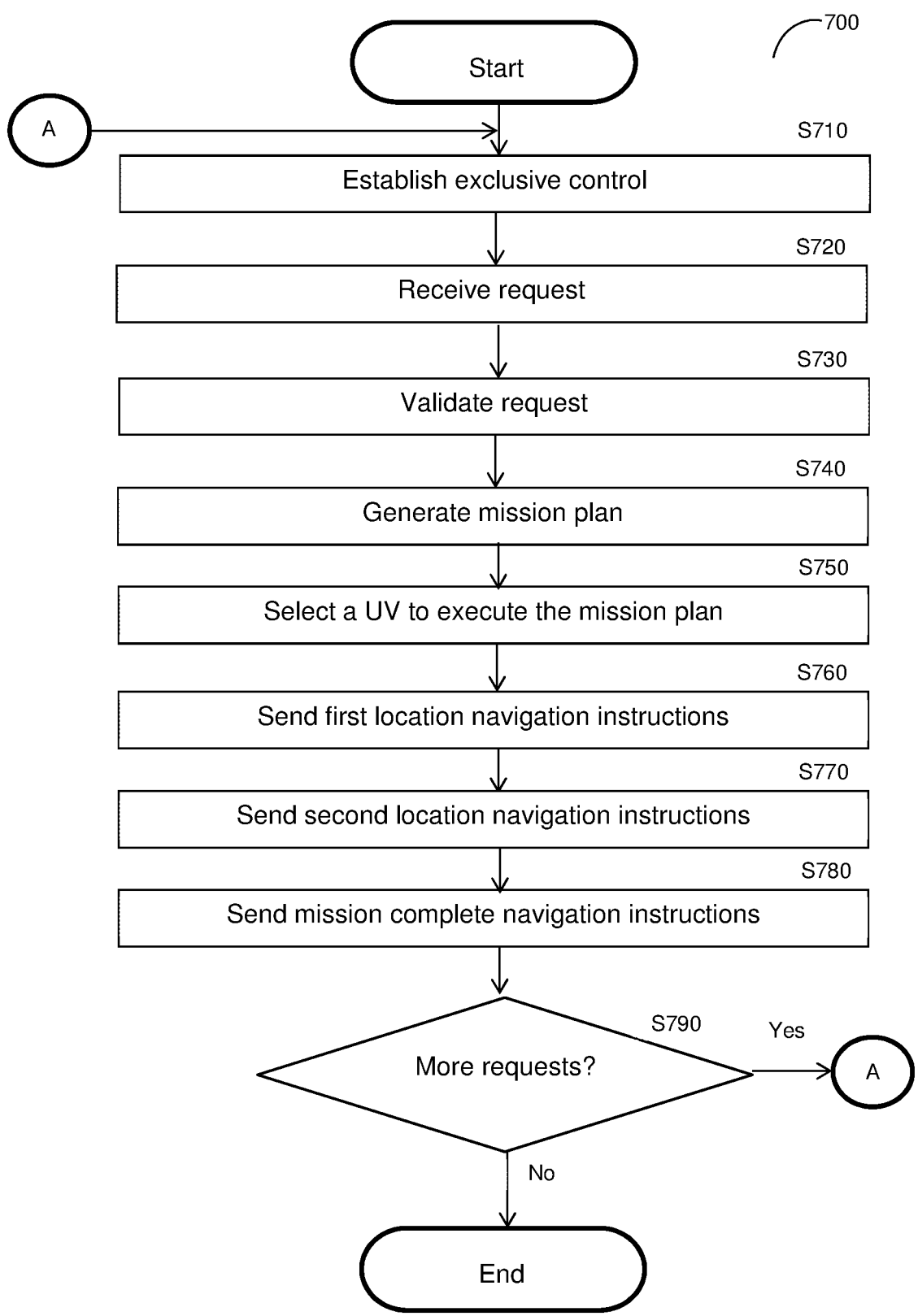
FIG. 7 is a flowchart illustrating a method for centralized control of an unmanned vehicle according to an embodiment.

FIG. 7 is an example flowchart 700 illustrating a method for centralized control of a UV according to an embodiment. In an embodiment, the method may be performed by the first node 100, FIG. 1.

At S710, exclusive control of at least one UV is established. In an embodiment, the exclusive control is established as described further herein above with respect to FIG. 4.

At S720, a request for third party access to a UV is received. The request may indicate control instructions such as, but not limited to, navigation instructions and instructions to accept and release a payload (e.g., a package). The request may further include an identifier of a second node operated by a third party (e.g., the user device 320 or the second apparatus 330, FIG. 3). The request may be received from, for example, the second node.

At S730, the request is validated. The validation may be based on a predetermined list of authorized third party devices (e.g., as compared to the identifier received at S720), based on one or more security keys from the second node, based on a subset of allowable control instructions, a combination thereof, and the like. If the validation fails (e.g., the third party is not authorized, the requested navigation is not in the allowable subset of control instructions, the third party is not authorized to direct navigation to the first location or to the second location), execution may terminate or another attempt to validate (e.g., using a different form of validation) may be performed. As a non-limiting example for a third party not being allowed to direct navigation, the third party may only be authorized to direct the UV to move within Italy such that requests to navigate outside Italy are not valid.

At S740, based on the control instructions included in the request, a mission plan is generated. In an embodiment, the mission plan includes navigating to a first start location, accepting a payload, navigating from the start location to a second end location, and releasing the payload.

At S750, a UV to execute the mission plan is selected. The selected UV is one of the UVs with which exclusive control was established. The selected UV may be selected based on, for example, geographical locations of each exclusively controlled UV, capabilities of each UV, availability of each UV (i.e., whether each UV is currently executing a mission plan or is not being used currently), fuel or power of each UV, a distance from a current location to the first location, a distance from the first location to the second location, a combination thereof, and the like. The capabilities of each UV may include, for example, volume of payloads, weight of payloads, short distance (e.g., below a predetermined threshold distance), long distance (e.g., above a predetermined threshold distance), short time (e.g., below a predetermined threshold time), long time (e.g., above a predetermined threshold time), single stop (e.g., from the first location to the second location), multi-stop (e.g., from the first location to the second location to a third location to a fourth location and so on), and the like.

As a non-limiting example for selecting a UV, the closest available UV that can accept payloads may be selected. Further, that UV may only be selected if it has sufficient battery charge to navigate to the first location then to the second location.

In an embodiment, S750 may further include switching to a second mode of control from a first mode of control. As an example, in the first mode, the UV may be controlled based on a default configuration. The default configuration may include, but is not limited to, remaining stationary (e.g., at a facility housing the UV), navigating to refuel or recharge, navigating to another base location, a combination thereof, and the like. In the second mode, the UV is controlled based on the mission plan. Alternatively or collectively, the UV may be at least partially controlled based on control instructions received from the second node in real-time, for example as described further herein above with respect to FIG. 5.

At S760, navigation instructions for navigating to the first location are sent. In an embodiment, S760 may further include sending control instructions for accepting a payload at the first location (e.g., instructions for opening a hatch or otherwise allowing for attachment or insertion of a payload).

At S770, navigation instructions for navigating to the second location are sent. The second location navigation instructions may be sent, for example, when the UV arrives at the first location (e.g., based on GPS signals received from the UV), when the UV accepts the payload at the first location, when a confirmation is received from the second node that the UV has arrived or accepted a payload, and the like. In an embodiment, S770 may further include sending other control instructions such as, for example, releasing a payload when the UV is at the second location.

In an embodiment, S770 may include sending navigation instructions for navigating to multiple second locations, thereby allowing for, e.g., delivering multiple payloads received at the first location to different second locations. For example, a seller at the first location may attach multiple packages to a drone, with each package being released at a different second location.

At optional S780, navigation instructions for navigating after the mission is completed are sent. The mission complete navigation instructions may be sent, for example, when the UV arrives at the second location, when the UV releases the payload at the first location, when a confirmation is received from the second node that the UV has arrived or released a payload, and the like. The mission complete navigation instructions may include, for example, instructions to remain stationary, instructions to navigate to a particular location (e.g., a location of a housing facility for the UV), and the like.

In an embodiment, S780 may include switching from the second mode of control back to the first mode of control as described herein above. Thus, the UV may be controlled based on third party instructions during the second mode, and based on first party (e.g., the owner of the UV) instructions, second party (e.g., an entity authorized to directly control the UV on behalf of the first party) instructions during the first mode, or default instructions, during the first mode.

At S790, it is determined whether additional requests for third party access have been received and, if so, execution continues with S720; otherwise, execution terminates. In some implementations, when additional requests for third party access have been received and the same UV is selected to execute a new mission plan including navigating from a third location to a fourth location, the new UV may continue directly to the third location from the second location rather than, e.g., returning to a home location.

As a non-limiting example, an apparatus owned by a company "Safari Online Marketplace" establishes exclusive control with various drones configured for navigating and transporting packages. The drones are controlled in a first mode of operation where they navigate to complete various activities such as delivering packages sold by Safari Online Marketplace. A request for one of the drones to deliver a third party package is received from a user device of a member of the "Safari Seller" membership program. The request indicates a seller location and a buyer location. The seller is validated by entering his Safari Account password. When the user is validated, a mission plan is generated based on the seller location and the buyer location. The drone that is closest to the seller location is selected to execute the mission plan.

Control switches to a second mode, where the drone is sent navigation instructions for navigating to the seller location. When a confirmation that a package has been received by the drone at the seller location is received from the seller user device, the drone is sent navigation instructions for navigating to the buyer location. When a confirmation that a package has been released by the drone at the buyer location is received from a buyer user device, control switches back to a first mode and mission complete navigation instructions are sent to the drone. If other requests for delivering third party packages are received, a new mission plan may be generated for the drone. Otherwise, the drone returns to a Safari housing facility.

It should be understood that various embodiments described herein above are discussed with respect to unmanned vehicles (UVs) merely for simplicity purposes and without limitation on the disclosed embodiments. Manned vehicles, robots, or any other system capable of controlled propulsion may be equally utilized without departing from the scope of the disclosure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An apparatus for centralized control of a vehicle, comprising:
   a processing circuitry; and
   a memory, the memory containing instructions that, when executed by the processing circuitry, configure the apparatus to:
   establish control of a vehicle, wherein establishing the control further includes determining a set of instructions for controlling the vehicle, wherein the apparatus is configured to control the vehicle based on the determined set of instructions;
   determine, for a node, a subset of the set of instructions for controlling the vehicle;
   generate a mission plan for the vehicle based on a request from the node when the request is valid, wherein the request indicates a requested navigation from a first location to a second location, wherein the request is not valid when the requested navigation is not in the subset of instructions; and
   send, to the vehicle, control instructions for navigating to the first location and control instructions for navigating from the first location to the second location based on the mission plan.

2. The apparatus of claim 1, wherein the request is not valid when the node is not authorized to control the vehicle.

3. The apparatus of claim 1, wherein the requested navigation is in the subset of instructions when the subset of instructions includes the control instructions for navigating to the first location and the control instructions for navigating from the first location to the second location.

4. The apparatus of claim 1, wherein the requested navigation is not in the subset of instructions when the subset of instructions does not include any of: the control instructions for navigating to the first location, and the control instructions for navigating from the first location to the second location.

5. The apparatus of claim 1, wherein the vehicle is selected from among a plurality of vehicles based on the mission plan and at least one of: a geographical location of each of the plurality of vehicles, an availability of each of the plurality of vehicles, a capability of each of the plurality of vehicles, an amount of fuel of each of the plurality of vehicles, and an amount of power of each of the plurality of vehicles.

6. The apparatus of claim 1, wherein the control instructions for navigating to the first location further include instructions for accepting a payload when the vehicle is at the first location.

7. The apparatus of claim 1, wherein the control instructions for navigating from the first location to the second location further include instructions for releasing a payload when the vehicle is at the second location.

8. The apparatus of claim 1, wherein the control is established via a vehicle system of the vehicle, wherein the established control is exclusive control, wherein the vehicle system is configured to execute only instructions from the apparatus.

9. The apparatus of claim 1, wherein the node is a user device, wherein the first location and the second location are based on user inputs from the user device.

10. A non-transitory computer readable medium having stored thereon instructions for causing a processing circuitry to perform a process, the process comprising:
   establishing control of a vehicle, wherein establishing the control further comprises determining a set of instructions for controlling the vehicle, wherein the apparatus is configured to control the vehicle based on the determined set of instructions;
   determining, for a node, a subset of the set of instructions for controlling the vehicle;
   generating a mission plan for the vehicle based on a request from the node when the request is valid, wherein the request indicates a requested navigation from a first location to a second location, wherein the request is not valid when the requested navigation is not in the subset of instructions; and
   sending, to the vehicle, control instructions for navigating to the first location and control instructions for navigating from the first location to the second location based on the mission plan.

11. A method for centralized control of a vehicle, comprising:
   establishing control of a vehicle, wherein establishing the control further comprises determining a set of instructions for controlling the vehicle, wherein the apparatus is configured to control the vehicle based on the determined set of instructions;
   determining, for a node, a subset of the set of instructions for controlling the vehicle;
   generating a mission plan for the vehicle based on a request from the node when the request is valid, wherein the request indicates a requested navigation from a first location to a second location, wherein the request is not valid when the requested navigation is not in the subset of instructions; and
   sending, to the vehicle, control instructions for navigating to the first location and control instructions for navigating from the first location to the second location based on the mission plan.

12. The method of claim 11, wherein the request is not valid when the node is not authorized to control the vehicle.

13. The method of claim 11, wherein the requested navigation is in the subset of instructions when the subset of instructions includes the control instructions for navigating to the first location and the control instructions for navigating from the first location to the second location.

14. The method of claim 11, wherein the requested navigation is not in the subset of instructions when the subset of instructions does not include any of: the control instructions for navigating to the first location, and the control instructions for navigating from the first location to the second location.

15. The method of claim 11, wherein the vehicle is selected from among a plurality of vehicles based on the mission plan and at least one of: a geographical location of each of the plurality of vehicles, an availability of each of the plurality of vehicles, a capability of each of the plurality of vehicles, an amount of fuel of each of the plurality of vehicles, and an amount of power of each of the plurality of vehicles.

16. The method of claim 11, wherein the control instructions for navigating to the first location further include instructions for accepting a payload when the vehicle is at the first location.

17. The method of claim 11, wherein the control instructions for navigating from the first location to the second location further include instructions for releasing a payload when the vehicle is at the second location.

18. The method of claim 11, wherein the control is established via a vehicle system of the vehicle, wherein the established control is exclusive control, wherein the vehicle system is configured to execute only instructions from the apparatus.

19. The method of claim 11, wherein the node is a user device, wherein the first location and the second location are based on user inputs from the user device.

* * * * *